United States Patent
Masegi et al.

(10) Patent No.: US 6,882,076 B2
(45) Date of Patent: Apr. 19, 2005

(54) ROTARY ELECTRIC MACHINE STATOR AND METHOD OF MANUFACTURING THE SAME

(75) Inventors: Makoto Masegi, Hazu-gun (JP); Hiroshi Ishida, Anjo (JP)

(73) Assignee: Denso Corporation, Kariya (JP)

( * ) Notice: Subject to any disclaimer, the term of this patent is extended or adjusted under 35 U.S.C. 154(b) by 89 days.

(21) Appl. No.: 10/316,025

(22) Filed: Dec. 11, 2002

(65) Prior Publication Data

US 2003/0122441 A1 Jul. 3, 2003

(30) Foreign Application Priority Data

Dec. 13, 2001 (JP) ........................................ 2001-379911

(51) Int. Cl.[7] ............................ H02K 15/08; H02K 3/12
(52) U.S. Cl. ..................... 310/201; 310/184; 310/195; 310/180
(58) Field of Search ................................ 310/179, 180, 310/184, 195, 198, 201

(56) References Cited

U.S. PATENT DOCUMENTS

| 2,407,935 | A | * | 9/1946 | Perfetti et al. | 310/201 |
| 6,208,058 | B1 | * | 3/2001 | Taji et al. | 310/201 |
| 6,252,326 | B1 | * | 6/2001 | Umeda et al. | 310/179 |
| 6,694,598 | B1 | * | 2/2004 | Takahashi et al. | 29/596 |
| 6,700,282 | B1 | * | 3/2004 | Mori et al. | 310/208 |

FOREIGN PATENT DOCUMENTS

JP    B2 3196738    6/2001    .......... H02K/15/06

* cited by examiner

*Primary Examiner*—Burton Mullins
(74) *Attorney, Agent, or Firm*—Oliff & Berridge, PLC

(57) ABSTRACT

In a rotary electric machine stator, a stator coil is formed of plural U-shaped conductor segments. Each of the conductor segments has a U-shaped turn portion disposed at one end of a stator core to form one of said coil ends, a pair of in-slot portion extending from the turn portion and inserted into slots and end portions extending from the in-slot portions to form the other coil end. One of the end portions of one of the U-shaped conductor segments extends straight in an axial direction, and the other bends in a circumferential direction by a predetermined angle to provide a wide cooling surface.

4 Claims, 7 Drawing Sheets

US 6,882,076 B2

ROTARY ELECTRIC MACHINE STATOR AND METHOD OF MANUFACTURING THE SAME

CROSS REFERENCE TO RELATED APPLICATION

The present application is based on and claims priority from Japanese Patent Application 2001-379911, filed Dec. 13, 2001, the contents of which are incorporated herein by reference.

BACKGROUND OF THE INVENTION

1. Field of the Invention

The invention relates to a rotary electric machine stator and a method of manufacturing such a stator.

2. Description of the Related Art

A stator coil that is formed of a plurality of conductor segments that is disposed in slots of a stator and welded to one another has been proposed. For example, Japanese Patent 3196738 discloses a stator coil formed of a plurality of conductor segments that is welded to one another.

In such a stator coil, a pair of straight portions of a U-shaped conductor segment is inserted into a pair of slots that is one pole-pitch spaced apart from each other and the ends of the straight portions are welded to others. The Japanese patent proposes a twister to bend portions of ends of a pair of straight portions portions of U-shaped conductor segments that extends in the axial direction from an end of a stator core to be welded and a lifting driver to move the ends in an axial direction. That is, manufacturing work of the stator coil formed of a plurality of U-shaped conductor segments includes a step of bending ends of the conductor segments and a step of welding the ends to others. However, the step of bending is rather complicated.

JP-A-2001-37131 discloses stator having a plurality of L-shaped conductor segments that are inserted in slots of a stator and are welded to one another at opposite ends thereof. Although the stator does not require a step of bending, the stator has twice as many welding portions and portions to insulate as a stator having U-shaped conductor segments.

SUMMARY OF THE INVENTION

Therefore, the present invention has been made in view of the above problems.

A main object of the invention is to provide an improved rotary electric machine stator that has a plurality of U-shaped conductor segments.

Another object of the invention is to provide a simple method of manufacturing such a stator.

According to one of main features of the invention, a rotary electric machine stator includes a stator core, a stator coil formed of a plurality of U-shaped conductor segments each of which has a U-shaped turn portion disposed at one end of the stator core to form one of the coil ends, a pair of in-slot portions inserted into the slots and end portions extending from the in-slot portions to form the other coil end. In the above-described stator, each of the end portions has a straight connection portion welded to another, the in-slot portions are aligned in a radial direction, and one of the end portions of one of the U-shaped conductor segments extends straight in an axial direction, and the other is bent in a circumferential direction by a predetermined angle. Therefore, the bending step becomes very simple. In addition, the coil ends have wider cooling surfaces than a prior art stator, as discussed below with reference to FIGS. 11 and 12.

FIG. 11 illustrates a pair of end portions a and b of conductor segments that extend from different slots of a stator core and respectively bent by 45 degree in angle in opposite circumferential directions to form a coil end. FIG. 12 illustrates a pair of end portions c and d of conductor segments that extend from different slots of a stator core. The end portion c is bent by 30 degree in angle in one circumferential direction and the end portion d is not bent. Both the coil ends have the same height 1L. However, the total length of the end portions a and b is about 2.6L, while the total length of the end portions c and d is 3L, which increases the cooling surface.

According to another feature of the invention, one of the pair of end portions of one of the U-shaped conductor segments is bent by 50% larger than the other in a circumferential direction. This feature also can increase the cooling surface of the coil ends.

According to another feature of the invention, a method of manufacturing rotary electric machine stator is comprised of the following steps: inserting a plurality of straight portions of U-shaped conductor segments into each slots from one end of a stator core to form radially aligned layers so that end portions of the straight portions extend outward from the other end of the stator core; bending those of the end portions of the straight portions disposed in prescribed layers in a circumferential direction by a predetermined angle; and welding ends of a predetermined pair of a bent end portion and a straight end portion together to form a coil end. Thus, the rotary electric machine stator described above can be provided.

According to another feature of the invention, a new method includes the following steps: bending a first group of the end portions of the straight portion disposed in prescribed layers in one circumferential direction by a first angle; bending a second group of the end portions of the straight portion disposed in the rest of the layers in the other circumferential direction by a second angle that is 50% larger than the first angle; and welding ends of a predetermined pair of an end portion of the first group and an end portion of the second group together to form a coil end.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
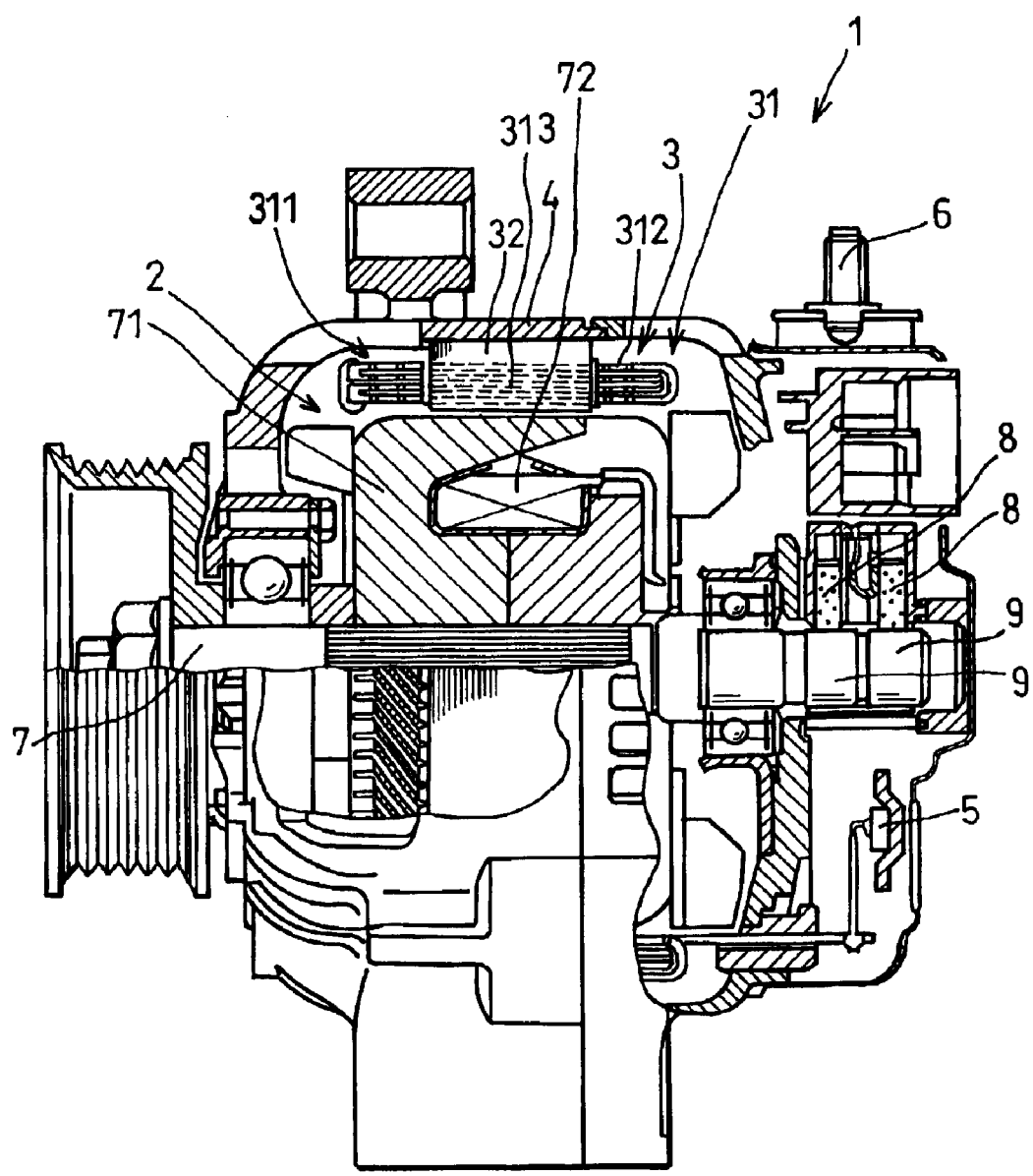
FIG. 1 is a cross-sectional side view illustrating a vehicle ac generator that includes a stator according to the first embodiment of the invention.

As shown in FIG. 1, a vehicle ac generator 1 includes a rotor 2, a stator 3, a housing 4, a rectifier unit 5, an output terminal 6, a rotary shaft 7, a pair of brushes 8 and a pair of slip rings 9. The stator 3 includes a stator coil 31 and a stator core 32 that is fixed to the inner periphery of the housing 4. The stator coil 31 is mounted in a plurality of slots formed in the stator core 32. The rotor 3 includes a rotor core 71 and a field coil 72 wound around a center boss of the rotor core 71 and is disposed radially inner side of the stator 3. The stator coil 31 is a three-phase armature winding that has three ac output terminals for providing three-phase ac voltage, which is rectified by the rectifier unit 5 to provide dc voltage at the output terminal 6. The field coil 72 is excited to form a magnetic field by field current that is supplied thereto via the pair of brushes 8 and the pair of slip rings 9. The field current is controlled by a regulator, which is not shown here, to provide regulated output voltage.

Figure 2:
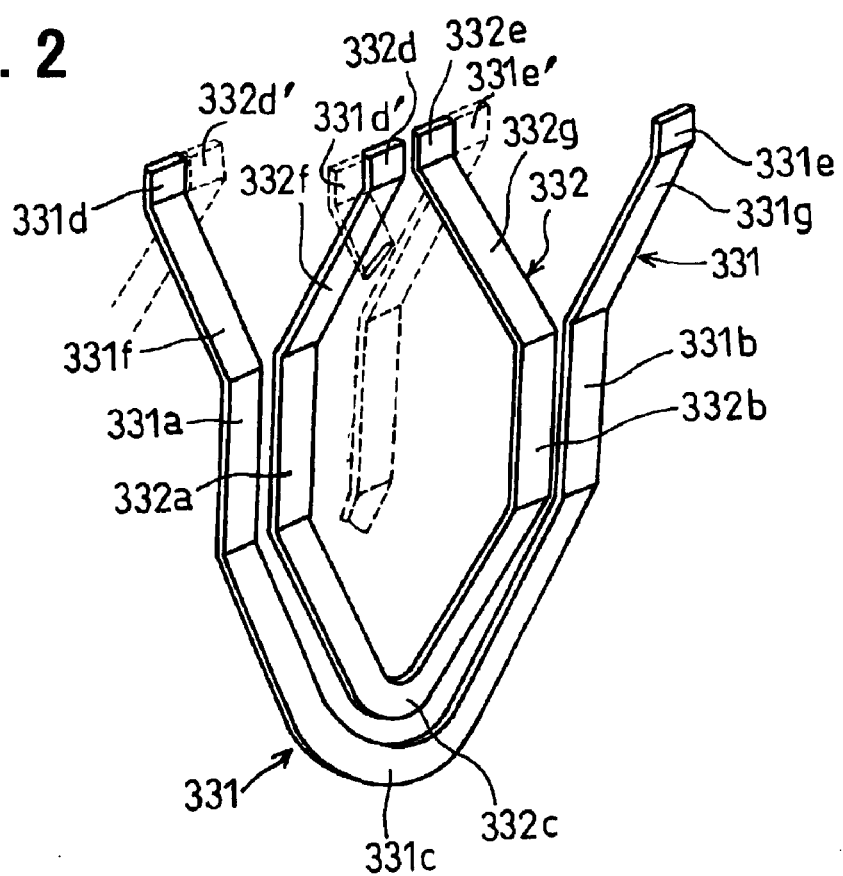
FIG. 2 is a perspective view illustrating a pair of U-shaped conductor segments of the stator shown in FIG. 1.

The stator coil 31 is formed in the following manner. As shown in FIG. 2, a pair of U-shaped conductor segments 331 and 332 is inserted into a pair of the slots from one end of the stator core 32 so that ends of the conductor segments protrude from the other end of the stator core 32 as high as necessary. Then, the ends of a plurality of the conductor segments are bent by a predetermined angle in a circumferential direction to bring connection portions thereof to connection portions of another plurality of conductor segments to be welded together. The stator core 32 has 36 slots formed at equal angular intervals in the inner surface thereof. Each of the U-shaped conductor segments 331, 332 has a U-shaped flat portion covered by insulation film except the connection portions formed at the opposite ends thereof.

The stator coil 31 has a ring-shaped first coil end 311 disposed at one end of the stator core 32, a ring-shaped second coil end 312 disposed at the other end of the stator core 32 and in-slot portions disposed in the slots.

As shown in FIG. 2, there are two kinds of U-shaped conductor segments, a large segments 331 and a small conductor segment 332. The large conductor segment 331 has a pair of in-slot portions 331a and 331b, a turn portion 331c and a pair of end portions 331f and 331g. The end portions 331f, 331g respectively have connection portions 331d, 331e. The in-slot portion 331a is called an inner in-slot portion, and the in-slot portion 331b is called an outer in-slot portion. The small conductor segment 332 has a pair of in-slot portions 332a and 332b, a turn portion 332c and a pair of end portions 332f and 332g. The end portions 332f, 332g respectively have connection portions 332d and 332e. The in-slot portion 332a is called an inner in-slot portion, and the in-slot portion 332b is called an outer in-slot portion. A reference numeral with dash (') indicates a portion that corresponds to the portion indicated the same reference numeral. That is, the connection portion 332d and a connection portion 331d', which are disposed side by side in the radial direction, are welded together, the connection portion 332d and a connection portion 331d' are welded together, and the connection portion 332e and a connection portion 331e' are welded together. Thus, the first coil end 311 is formed by the end portions 331f, 331g, 332f and 332g, of the U-shaped conductor segments 331, 332, and the second coil end 312 is formed by the turn portions 331c and 332c of the same.

The inner in-slot portions 331a, 332a are inserted in one of a pair of slots 35 that are one pole-pitch of the rotor core 71 spaced apart from the other in which the outer in-slot portions 331b, 332b are inserted so that the turn portion 332c of the small conductor segment 332 is enclosed by the turn portion 331c of the large conductor segment 331.

Figure 3:
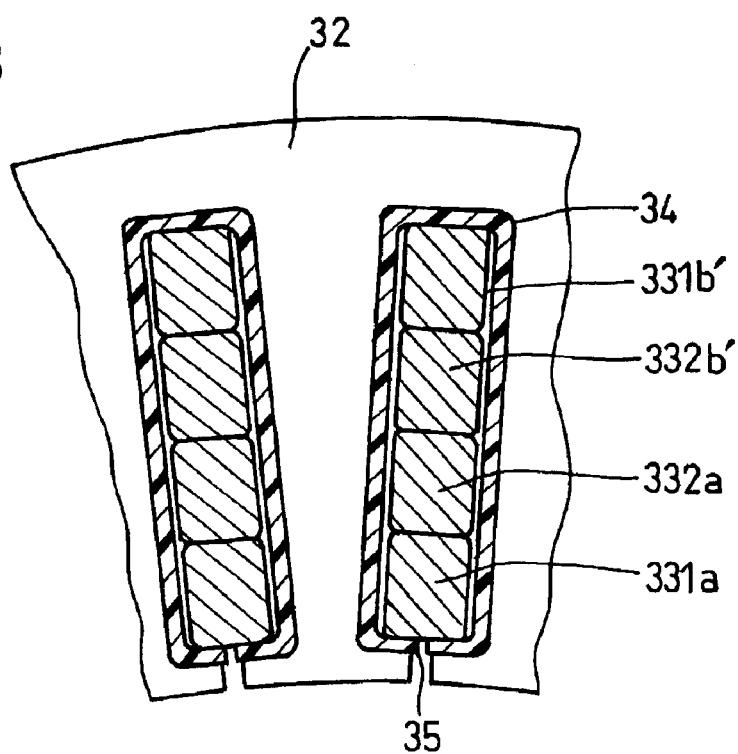
FIG. 3 is a fragmentary cross-sectional view of the stator.
Figure 4:
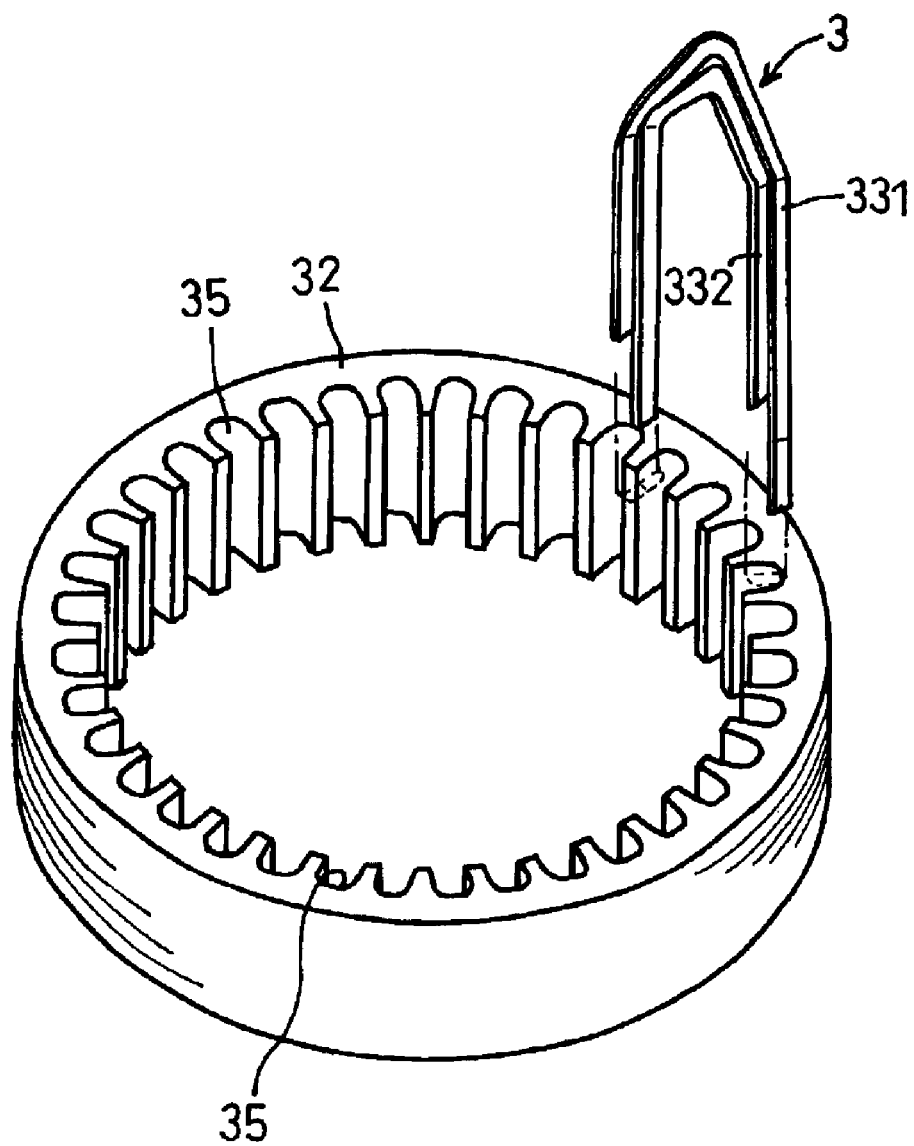
FIG. 4 is a perspective view illustrating a pair of U-shaped conductor segments to be inserted into a pair of slots of the stator.

As shown in FIG. 3, the inner in-slot portion 331a is disposed at the radially innermost position of the slot 35, the in-slot portion 332a is disposed at the inner middle position, the in-slot portion 332b' is disposed at the outer middle position, and the in-slot portion 331b' is disposed at the outermost position. Thus, four radially aligned in-slot portions are accommodated in each slot 35. The inner in-slot portions 331a' and 332a' that are counterparts of the above in-slot portions 331b' and 332b' are disposed in another slot that is one pole pitch spaced apart. Incidentally, reference numeral 34 indicates an insulator.

The end portion 331g that extends from the outer in-slot portion 331b of the large conductor segment 331 is bent by a first angle in one circumferential direction, and the end portion 331f that extends from the outer in-slot portion 331a of the large conductor segment 331 is bent by a second angle in the other circumferential direction. The total bending angle of the first angle and the second angle corresponds to one pole pitch.

Thereafter, the connection portion 331d of the radially innermost layer and the connection portion 332d' of the inner middle layer are welded together by a welder such as a TIG welder, a resistance welder, an electric beam welder or laser welder, and the connection portion 331e of the outer middle layer and the connection portion 331e' of the radially innermost layer are welded together, as shown in FIG. 2.

Figure 5:
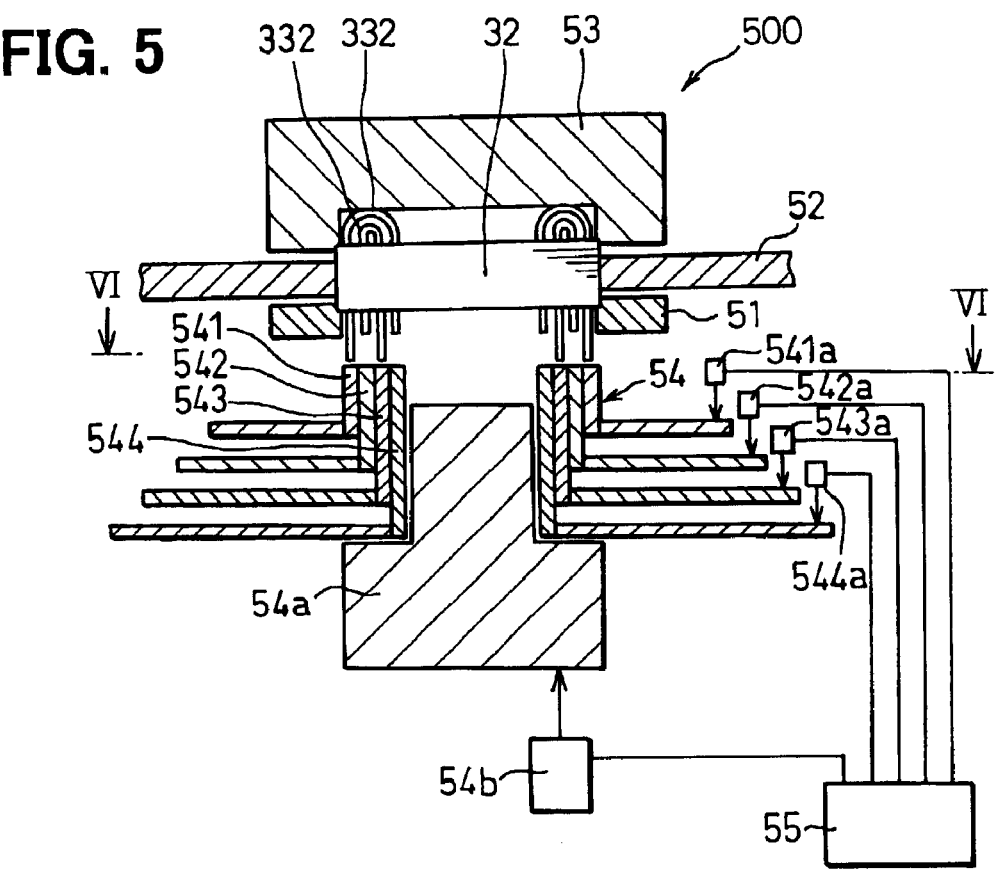
FIG. 5 is a cross-sectional side view of a former.
Figure 6:
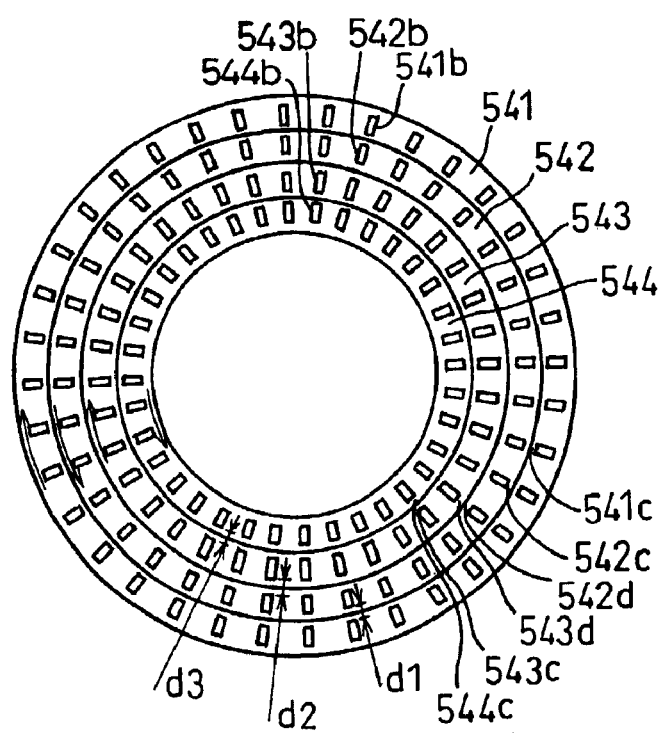
FIG. 6 is a plan view of a twister.

As shown in FIGS. 5 and 6, a former 500 is comprised of a work support 51 that supports the stator core 32, a damper 52 that clamps the stator core 32, a work presser 53 that presses the stator core 32 against the work support 51, a twister 54 that bend the straight portions of the U-shaped conductor segments, a lifting shaft 54a that moves the twister 54 up and down, four turning mechanisms 541a–544a that turn the twister 54, a lifting shaft driver 54b that drives the lifting shaft 54a and a controller 55 that controls the turning mechanisms 541a–544a and the lifting shaft driver 54b.

The twister 54 is comprised of four coaxial turning members 541–544. Each of the turning members 541–544 has a cylindrical portion and a flange portion that can rotate separately. The upper ends of four cylindrical portions are leveled with one another. As shown in FIG. 6, plural holding slots 541b, 542b, 543b and 544b are respectively formed at the upper end of each of the four cylindrical portions in the circumferential direction, thereby holding the end portions 331f, 331g, 332f and 332g. The number of the holding slots of each of the turning members 541–544 is the same as the number of the slots 35 of the stator sore 32. The holding slots 541b–544b of radially adjacent turning member are separated by separation zones 541c–544c and 542d–543d. That is, the holding slots 541b of the turning member 541 are separated by a distance d1 from the holding slots 542b of the turning member 542 by separation zone 541c of the turning member 541 and 542c of the turning member 542, the holding slots 542b of the turning member 542 are separated by d2 from the holding slots 543b of the turning member 543 by separation zone 542d of the turning member 542 and 543d of the turning member 543, and the holding slots 543b of the turning member 543 are separated by d3 from the holding slots 544b of the turning member 544 by separation zone 543c of the turning member 541 and 544c of the turning member 544. The separation zones 542d and 543d between the second turning member 542 and the third turning member 543 are formed so that the distance d2 is longer than any of distance d1 and d2. Therefore, the distance between the end portions of the conductor segments 331 and 332 extending from the first and second layers is sufficiently short to connect to each other at the connection portions, and the distance between the end portions extending from the third and fourth layers also short to connect to each other at the connection portions. On the other hand, the distance between the end portions extending from the second layer and the end the end portions extending from the third layer is sufficiently long to insulate from each other.

At first, the stator core 32 with the conductor segments 331, 332 inserted into the slots 35 is set on the work support 51. Thereafter, the stator core 32 is clamped by the clamper 52 at the outside thereof. Subsequently, the work presser 53 presses the upper end of the stator core 32 and the top of the turn portions of the large conductor segments 331, thereby restricting vertical motion of the stator core 32 and the conductor segments 331, 332. Then, the lifting shaft 54a lifts the twister 54 to insert a suitable length of the end portions of the conductor segments 331f, 331g, 332f and 332g, which respectively form the connection portions, into the holding slots 541b–544b. Preferably, the end portions are tapered off so that they can be inserted into the holding slots 541b–544b smoothly. The turning members 541–544 of the twister 54 are simultaneously rotated and moved vertically by the turning mechanisms 541a–544a, the lifting shaft 54a and lifting shaft driver 54b. That is, the first and third turning members 541 and 543 are turned clockwise by a first angle and the second and fourth turning members 542 and 544 are turned counterclockwise by a second angle.

It is important that the first angle is larger than the second angle by at least 50%. Therefore, the end portions 331f, 331g, 332f and 332g that extend outward from the slots 35 except the portions inserted in the holding slots 541b–544b are bent. Thereafter, the lifting shaft driver 54b and the turning mechanisms 541a–544a are controlled to rotate and lift the twister 54 so that the length of the end portions 331f, 331g, 332f and 332g remains constant. The end portions 331f, 331g, 332f and 332g are lifted and rotated to draw circles. This motion is continued until the angles become a half pole pitch larger than the predetermined angle in order to prevent the conductor segments from deforming due to spring back action. Because the end portions 331f, 331g, 332f and 332g are already bent at the portions adjacent the slots 35, the conductor segments do not fall away from the stator core 32.

Thereafter, the lifting shaft driver 54b is moved down and the turning mechanisms 541a–544a are reversed. The end portions 331f, 331g, 332f and 332g are taken off the holding slots 541b–544b, and the turning mechanisms 541a–544a are returned to original positions. Finally, the clamper 52 and the presser 53 are removed to take out the stator with the bent U-shaped conductor segments 331, 332.

Figure 7:
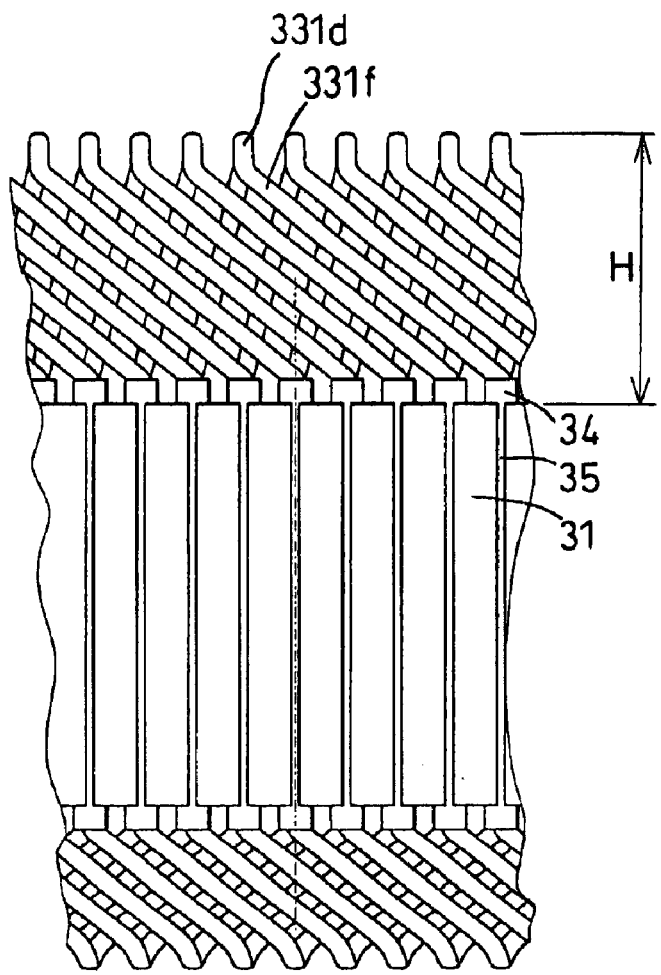
FIG. 7 is a fragmentary side view of the stator.
Figure 8:
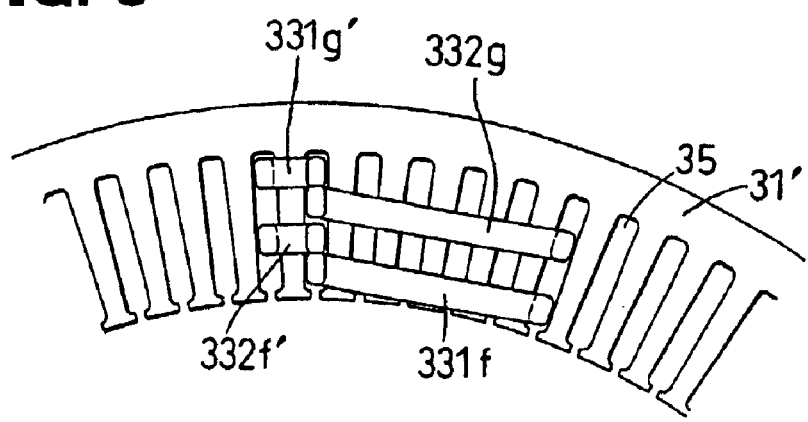
FIG. 8 is a fragmentary plan view illustrating a pair of U-shaped conductor segments that is mounted in a pair of slots of the stator core and bent in a prescribed manner.

Those of the end portions 331f, 331g, 332f and 332g adjacent to each other are welded together at the connection portions 331d, 331e, 332d and 332e to form a three-phase stator coil having prescribed turns, as shown in FIG. 7 and FIG. 8 which shows only one pair of conductor segments 331, 332.

Figure 9:
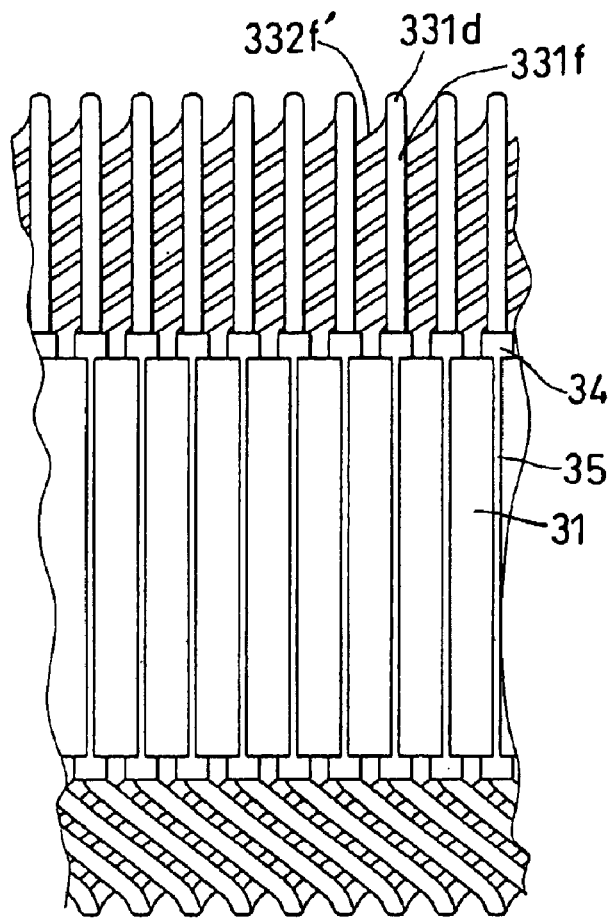
FIG. 9 is a fragmentary side view of the stator manufactured by another step of bending.
Figure 10:
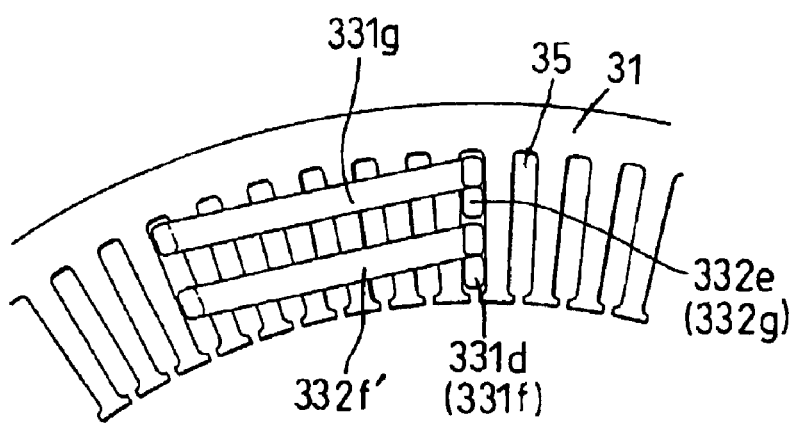
FIG. 10 is a fragmentary plan view illustrating a pair of U-shaped conductor segments that is mounted in a pair of slots of the stator core and bent in a prescribed manner.
Figure 11:
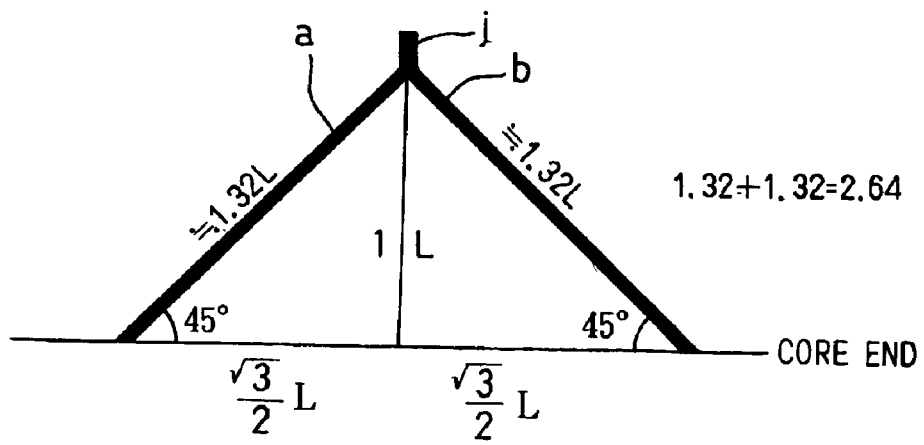
FIG. 11 is a schematic diagram illustrating relationship between a bending angle of a prior art U-shaped conductor segment and a coil end length thereof.
Figure 12:
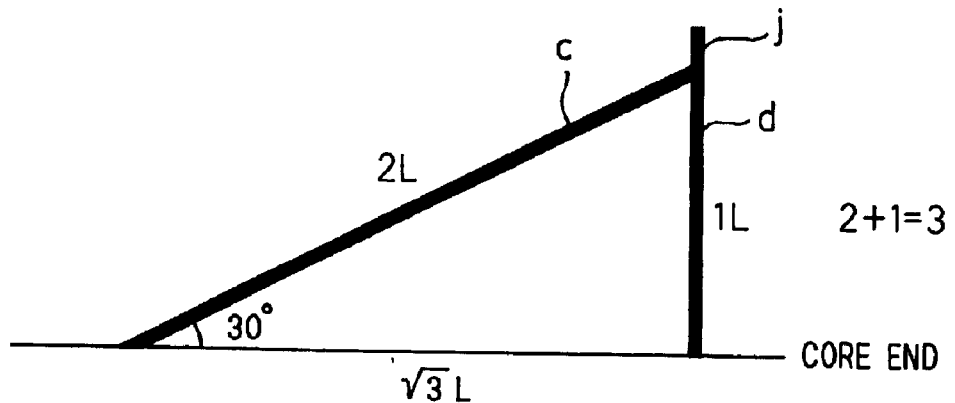
FIG. 12 is a schematic diagram illustrating relationship between a bending angle of a U-shaped conductor segment of the stator according to the invention and a coil end length thereof.

As shown in FIGS. 9 and 10, the conductor segments 331, 332 can be bent differently. In this case, the end portion 331g that extends from the outermost in-slot potion 331b is bent by one pole-pitch in a circumferential direction, and the end portion 331f that extends from the inner-most in-slot portion 331a is not bent and remains straight. In the same way, the end portion 332g that extends from the outer middle in-slot potion 332b is bent by one pole-pitch in the circumferential direction, and the end portion 332f that extends from the inner middle in-slot portion 332a is not bent and remains straight. That is, the end portions disposed in the second and fourth layers are bent by six slot-pitches in the circumferential direction, while the end portions disposed in the first and third layers extend straightly. Therefore, the turning members 542 and 544 and the turning mechanisms thereof shown in FIG. 5 can be omitted in this case.

The former 500 can be applied to various types of stators only by changing the turning members 541, 542, 543 and 544 of the twister 54. For example, it can be applied to stator having 48, 84 or 96 slots by using the turning member having the corresponding number of the holding slots.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A rotary electric machine stator, comprising:
    a stator core having a plurality of slots disposed in a circumferential direction thereof;
    a stator coil having coil ends at opposite ends of said stator core, said stator coil being formed of a plurality of U-shaped conductor segments each of which has a U-shaped turn portion disposed at one end of said stator core to form one of said coil ends, a pair of in-slot portion respectively extending from said turn portion and inserted into said slots and end portions respectively extending from said in-slot portions to form the other coil end,
    wherein:
    each of said end portions has a straight connection portion directly welded to another;
    a plurality of said in-slot portions are aligned in a radial direction;
    one of said end portions of one of said U-shaped conductor segments extends straight in an axial direction, and the other bends in a circumferential direction by a predetermined angle.

2. A rotary electric machine stator, comprising:
    a stator core having a plurality of slots disposed in a circumferential direction thereof;
    a stator coil having coil ends at opposite ends of said stator core, said stator coil being formed of a plurality of U-shaped conductor segments each of which has a U-shaped turn portion disposed at one end of said stator core to form one of said coil ends, a pair of in-slot portions respectively extending from said turn portion and inserted into said slots and end portions respectively extending from said in-slot portions in axial and radial directions, said end portions being directly connected to end portions of in-slot portions extending from turn portions of other U-shaped conductor segments to form the other coil end wherein, one of said pair of end portions of one of said U-shaped conductor segments bends by at least 50% larger than the other in a circumferential direction.

3. The rotary electric machine as claimed in claim 1, said stator coil being manufactured by a method comprising:

inserting said plurality of straight portions of U-shaped conductor segments into each slot from one end of said stator core to form a plurality of radially aligned layers so that end portions of said straight portions extend outward from the other end of said stator core;

bending those of said end portions of said straight portion disposed in prescribed layers in a circumferential direction by said predetermined angle; and welding ends of a predetermined pair of a bent end portion and a straight end portion together to form said the other coil end.

4. The rotary electric machine as claimed in claim 1, said stator coil being manufactured by a method comprising:

inserting said plurality of straight portions of U-shaped conductor segments into each slot from one end of said stator core to form a plurality of radially aligned layers so that end portions of said straight portions extend outward from the other end of said stator core;

bending a first group of said end portions of said straight portion disposed in prescribed layers in one circumferential direction by a first angle;

bending a second group of said end portions of said straight portion disposed in the rest of said layers in the other circumferential direction by a second angle that is 50% larger than said first angle; and welding ends of a predetermined pair of an end portion of said first group and an end portion of said second group together to form said the other coil end.

* * * * *